United States Patent
Noh et al.

(10) Patent No.: US 9,843,035 B2
(45) Date of Patent: Dec. 12, 2017

(54) HYDROTHERMAL SYNTHESIS DEVICE AND METHOD OF PREPARING CATHODE ACTIVE MATERIAL USING THE SAME

(71) Applicant: LG Chem, Ltd., Seoul (KR)

(72) Inventors: Hyun Kuk Noh, Daejeon (KR); Hong Kyu Park, Daejeon (KR); Chi Ho Jo, Daejeon (KR); Ji Hoon Ryu, Daejeon (KR); Sang Seung Oh, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 41 days.

(21) Appl. No.: 14/438,300

(22) PCT Filed: Nov. 27, 2013

(86) PCT No.: PCT/KR2013/010820
§ 371 (c)(1),
(2) Date: Apr. 24, 2015

(87) PCT Pub. No.: WO2014/084583
PCT Pub. Date: Jun. 5, 2014

(65) Prior Publication Data
US 2015/0280214 A1    Oct. 1, 2015

(30) Foreign Application Priority Data
Nov. 27, 2012 (KR) .................. 10-2012-0134968

(51) Int. Cl.
*B01J 19/02* (2006.01)
*B01J 19/24* (2006.01)
(Continued)

(52) U.S. Cl.
CPC ............ *H01M 4/136* (2013.01); *B01J 3/008* (2013.01); *B01J 3/02* (2013.01); *B01J 4/002* (2013.01);
(Continued)

(58) Field of Classification Search
None
See application file for complete search history.

(56) References Cited

U.S. PATENT DOCUMENTS

| 7,566,436 B2 | 7/2009 | Lester et al. |
| 2007/0020171 A1* | 1/2007 | Waki .................. B01J 3/008 |
| | | 423/599 |

(Continued)

FOREIGN PATENT DOCUMENTS

| EP | 2604335 A2 | 6/2013 |
| EP | 2883855 A1 | 6/2015 |

(Continued)

OTHER PUBLICATIONS

Kim, Yun Cheol et al., "Tribololgical properties of solid lubricants (graphite, WS2, MoS2) in the semi-metallic brake friction material," Conference held by the Korean Society of Tribologists and Lubrication Engineers, pp. 228-233 (Feb. 2009).

(Continued)

*Primary Examiner* — Jennifer A Leung
(74) *Attorney, Agent, or Firm* — Lerner, David, Littenberg, Krumholz & Mentlik, LLP

(57) ABSTRACT

Disclosed is a hydrothermal synthesis device for continuously preparing an inorganic slurry using a hydrothermal method. The hydrothermal synthesis device includes a mixer to mix at least one precursor solution for preparing an inorganic material, injected via at least one supply tube, to prepare an intermediate slurry, a connection tube provided at a side of the mixer, continuously discharging the prepared intermediate slurry to a reactor, and having a hydrophobic coating on an inner surface of a portion thereof adjacent to the reactor, and the reactor performing hydrothermal reaction of the intermediate slurry supplied from the connection tube by receiving a liquid stream heated to supercritical or subcritical conditions using a heat exchanger and connected (Continued)

to the connection tube into which the intermediate slurry prepared from the mixer is introduced and to at least one injection tube into which the heated liquid stream is injected.

21 Claims, 5 Drawing Sheets

(51) Int. Cl.
*H01M 4/136* (2010.01)
*B01J 19/18* (2006.01)
*H01M 4/58* (2010.01)
*B01J 3/00* (2006.01)
*B01J 3/02* (2006.01)
*B01J 4/00* (2006.01)
*H01M 4/02* (2006.01)

(52) U.S. Cl.
CPC ............... *B01J 19/02* (2013.01); *B01J 19/18* (2013.01); *B01J 19/24* (2013.01); *H01M 4/5825* (2013.01); *B01J 2204/007* (2013.01); *B01J 2219/00094* (2013.01); *B01J 2219/00247* (2013.01); *B01J 2219/00252* (2013.01); *B01J 2219/0204* (2013.01); *B01J 2219/0209* (2013.01); *B01J 2219/0236* (2013.01); *B01J 2219/0245* (2013.01); *B01J 2219/0286* (2013.01); *H01M 2004/028* (2013.01); *Y02P 20/544* (2015.11)

(56) References Cited

U.S. PATENT DOCUMENTS

2011/0274850 A1* 11/2011 Yang ...................... C23C 4/121
                                                                                427/453
2013/0129596 A1    5/2013 Noh et al.

FOREIGN PATENT DOCUMENTS

| EP | 2886191 A1      | 6/2015  |
|----|-----------------|---------|
| JP | 2002102672 A    | 4/2002  |
| JP | 2003340262 A    | 12/2003 |
| JP | 2010168253 A    | 8/2010  |
| KR | 20070001999 A   | 1/2007  |
| KR | 2011-0079551 A  | 7/2011  |
| KR | 20120015278 A   | 2/2012  |
| WO | 2012/020986 A2  | 2/2012  |

OTHER PUBLICATIONS

Bok Ryul Yoo, et al, "Synthesis and Applications of Advanced Materials Based on Silicon & Fluorine-Containing Compounds." Polymer Science and Technology, vol. 21, No. 5, Oct. 2010, pp. 416-425.

In Jun Park, et al., "Fluorine-Containing Surface Modification Agents." Prospectives of Industrial Chemistry, vol. 2, No. 2 (1999), pp. 13-19.

International Search Report for Application No. PCT/KR2013/010820 dated Jan. 10, 2014.

* cited by examiner

[FIG. 1]
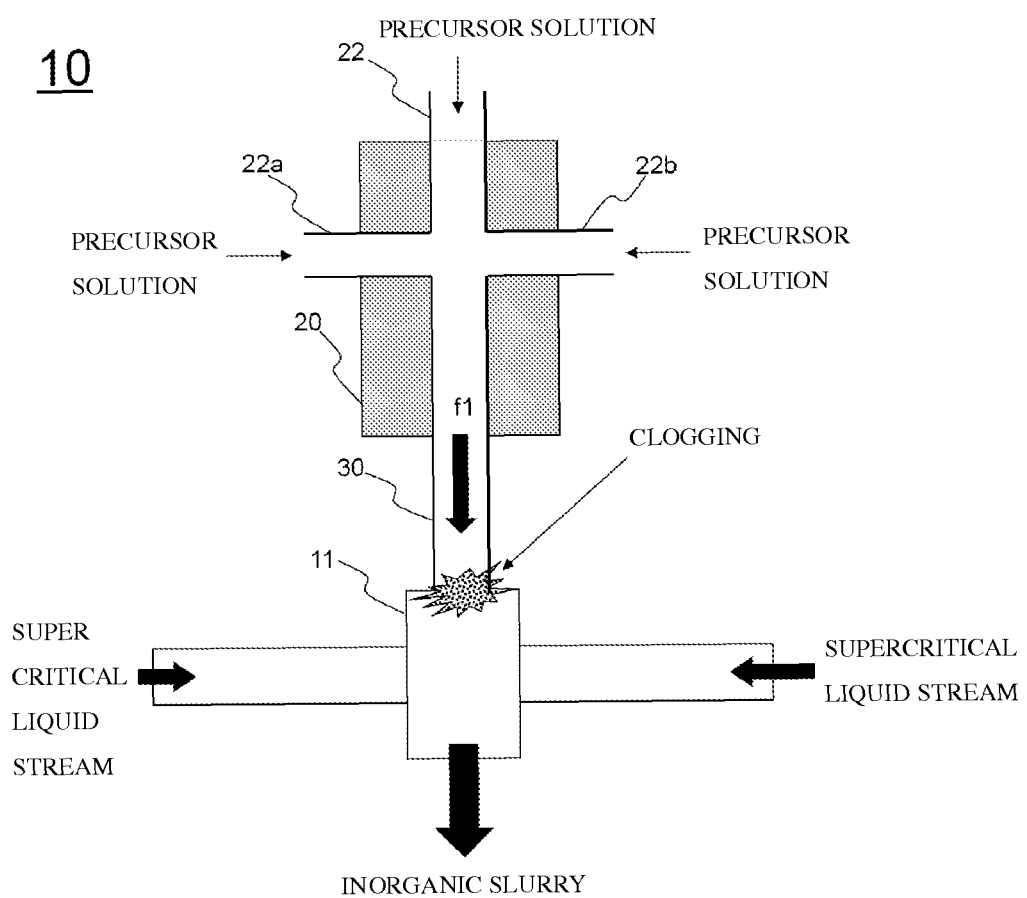
PRIOR ART

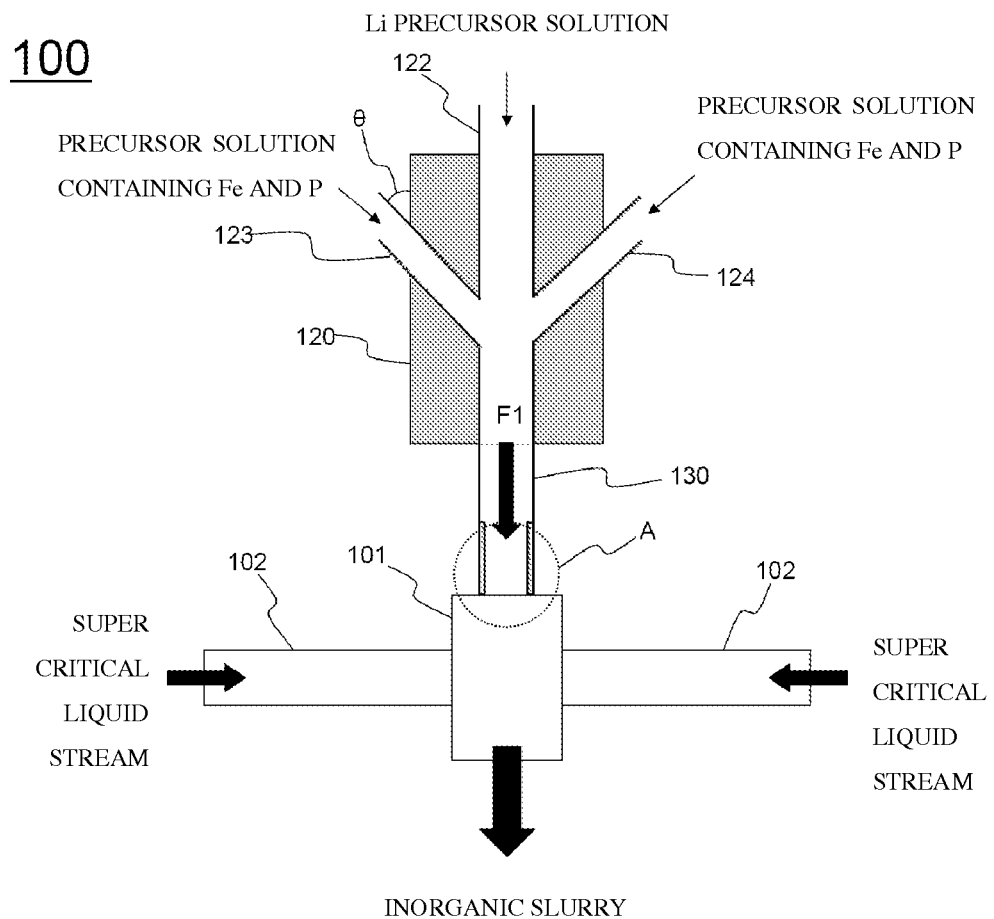
[FIG. 2]

【FIG. 3】
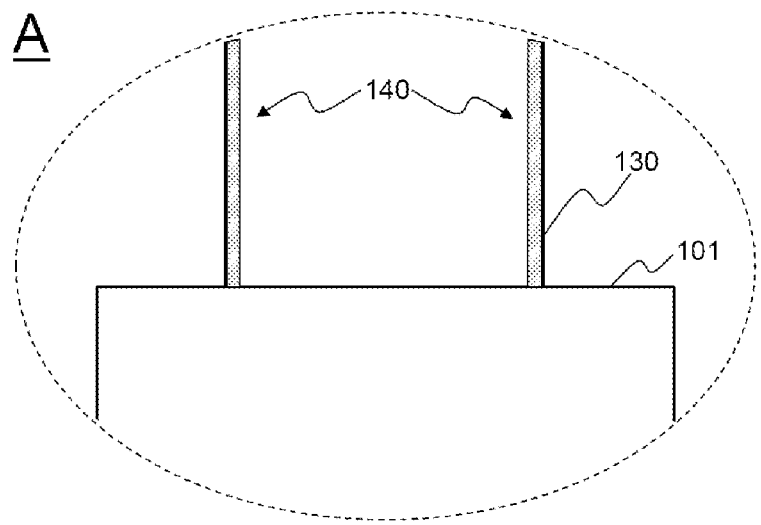
【FIG. 4】
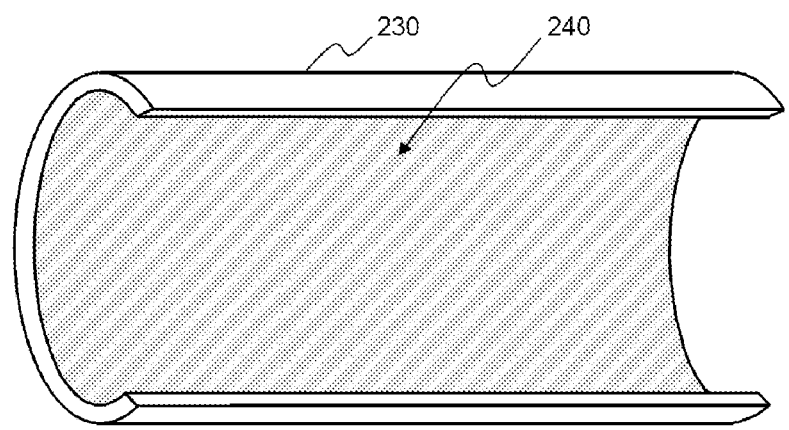

[FIG. 5]
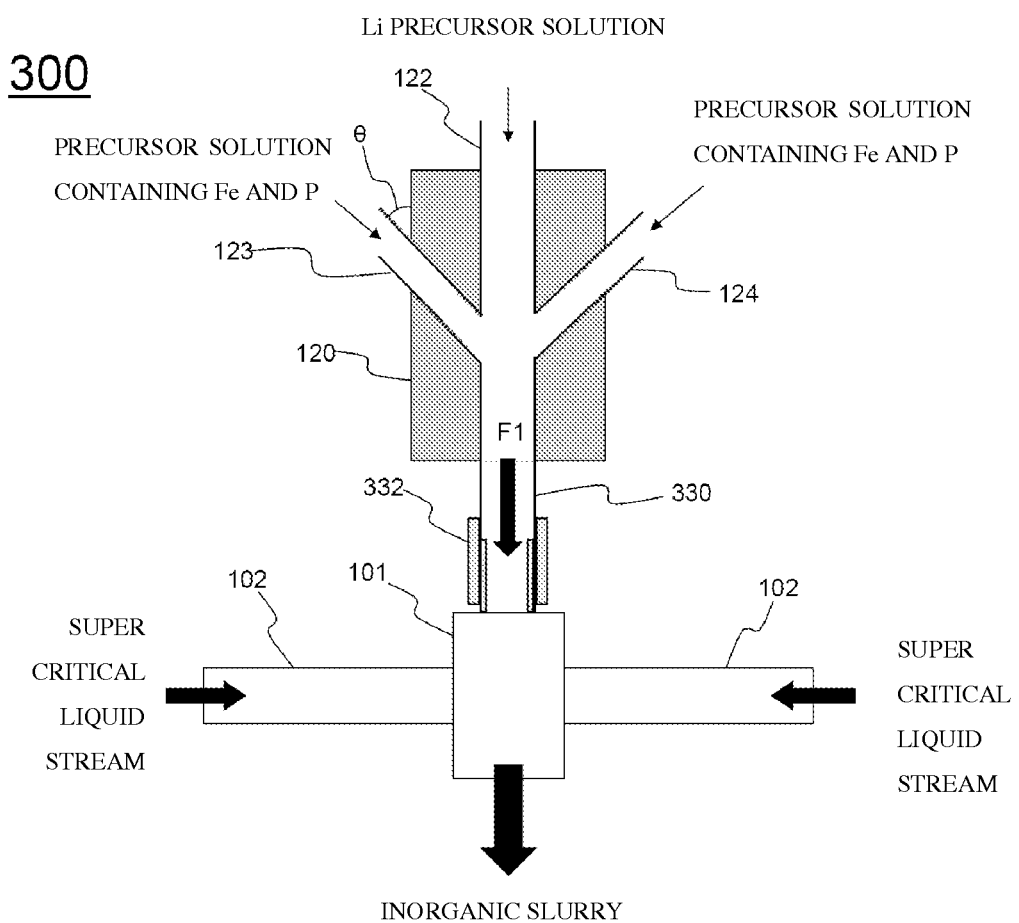

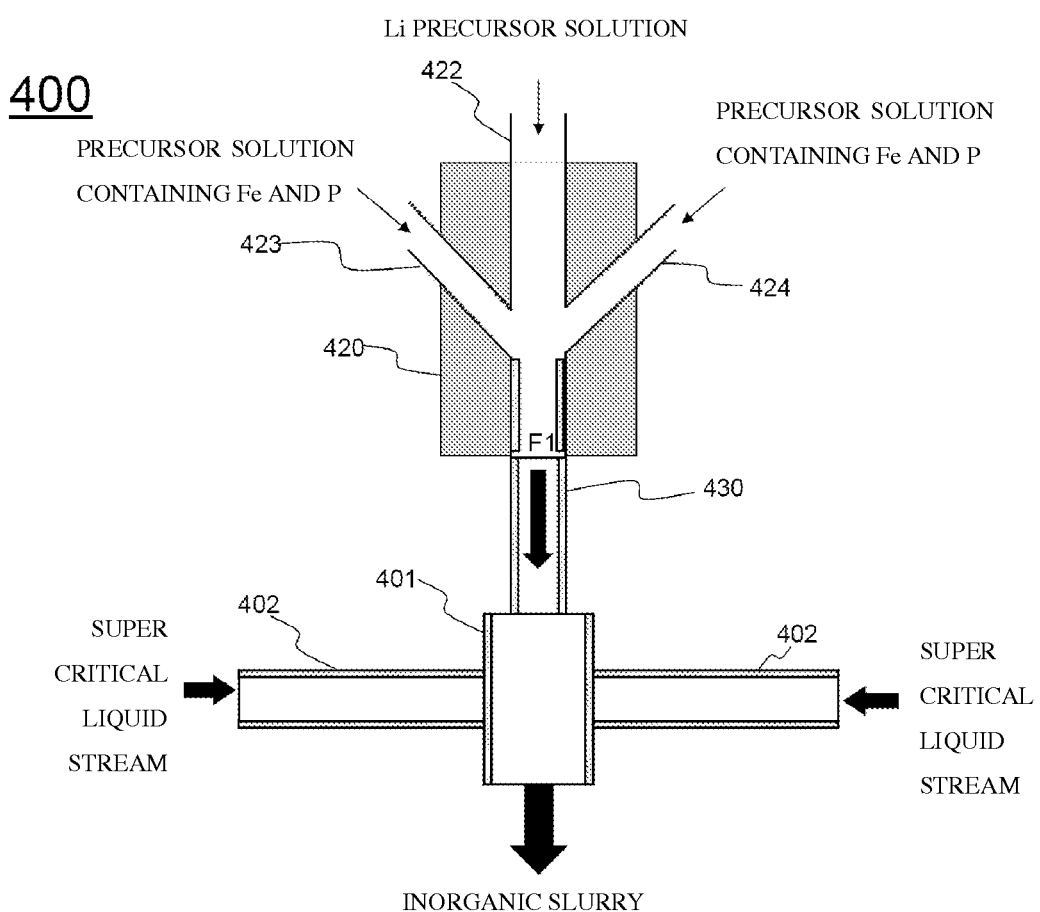

HYDROTHERMAL SYNTHESIS DEVICE AND METHOD OF PREPARING CATHODE ACTIVE MATERIAL USING THE SAME

CROSS-REFERENCE TO RELATED APPLICATION

This application is a national phase entry under 35 U.S.C. §371 of International Application No. PCT/KR2016/010820, filed Nov. 27, 2013, which claims priority to Korean Patent Application No. 10-2012-0134968, filed on Nov. 27, 2012, the disclosures of which are incorporated herein by reference.

TECHNICAL FIELD

The present invention relates to a hydrothermal synthesis device using supercritical water and a method of preparing a cathode active material using the same. More particularly, the present invention relates to a hydrothermal synthesis device for continuously preparing an inorganic slurry using a hydrothermal method, including: a mixer to mix at least one precursor solution for preparing an inorganic material, injected via at least one supply tube, to prepare an intermediate slurry; a connection tube provided at a side of the mixer, continuously discharging the prepared intermediate slurry to a reactor, and having a hydrophobic coating on an inner surface of a portion thereof adjacent to the reactor; and the reactor performing hydrothermal reaction of the intermediate slurry supplied from the connection tube by receiving a liquid stream heated to supercritical or subcritical conditions using a heat exchanger and connected to the connection tube into which the intermediate slurry prepared from the mixer is introduced and to at least one injection tube into which the heated liquid stream is injected, and a cathode active material prepared using the same.

BACKGROUND ART

Inorganic compounds are used as raw materials or final products in various fields and also used as raw materials of electrode active materials for secondary batteries, which have recently been increasingly used.

Lithium secondary batteries, which are a representative example of secondary batteries, generally use lithium cobalt oxide ($LiCoO_2$) as a cathode active material, a carbon material as an anode active material, and lithium hexafluorophosphate (($LiPF_6$) as an electrolyte. As the cathode active materials, layered $LiCoO_2$, lithium nickel oxide ($LiNiO_2$), spinel lithium manganese oxide ($LiMn_2O_4$), and the like are known, but $LiCoO_2$ is the most commonly used in commercial applications.

However, supply of cobalt as a main component is unstable and cobalt is expensive and thus materials, some cobalt atoms of which are substituted with a transition metal such as Ni, Mn, or the like, or spinel $LiMn_2O_4$ and the like which contain very little cobalt have begun to be commercially used. In addition, novel compounds with more stable structure even at high voltage or materials that are prepared by doping or coating existing cathode active materials with other metal oxides and thus have enhanced stability have been developed.

Among conventional methods of preparing cathode active materials, dry calcination and wet precipitation are mostly widely known methods. According to dry calcination, a cathode active material is prepared by mixing an oxide or hydroxide of a transition metal such as cobalt (Co) or the like with lithium carbonate or lithium hydroxide as a lithium source in a dried state and then calcining the resulting mixture at a high temperature of 700° C. to 1000° C. for 5 to 48 hours.

Dry calcination is, advantageously, a widely used technology for preparing metal oxides and thus is easy to approach, but is disadvantageous in that it is difficult to obtain single-phase products due to difficulties in uniform mixing of raw materials and, in the case of multi-component cathode active materials consisting of two or more transition metals, it is difficult to homogeneously arrange at least two elements to atom levels. In addition, when a method of doping or substituting with particular metal components to improve electrochemical performance is used, it is difficult to uniformly mix the particular metal components added in small amounts and loss of the metal components inevitably occurs through pulverizing and sorting processes performed to obtain desired particle sizes.

Another conventional method of preparing cathode active materials is wet precipitation. In wet precipitation, a cathode active material is prepared by dissolving a salt containing a transition metal such as Co or the like in water, adding alkali to the solution to precipitate the transition metal in the form of transition metal hydroxide, filtering and drying the precipitate, mixing the resulting precipitate with lithium carbonate or lithium hydroxide as a lithium source in a dried state, and calcining the mixture at a high temperature of 700° C. to 1000° C. for 1 to 48 hours.

The wet precipitation method is known to easily obtain a uniform mixture by co-precipitating, in particular, two or more transition metal elements, but requires a long period of time in precipitation reaction, is complicated, and incurs generation of waste acids as by-products. In addition, various methods, such as a sol-gel method, a hydrothermal method, spray pyrolysis, an ion exchange method, and the like, have been used to prepare a cathode active material for lithium secondary batteries.

In addition to the methods described above, a method of preparing an inorganic compound for a cathode active material by hydrothermal synthesis using high-temperature and high-pressure water is used.

With regards to this, referring to FIG. 1, in a conventional hydrothermal synthesis device 10, precursor solutions are respectively supplied from upper and side parts of a mixer 20 via supply tubes 22, 22a and 22b, the supplied precursor solutions are mixed to prepare an intermediate slurry f1 and then the intermediate slurry f1 is supplied to a reactor 11 via a connection tube 30 connected to the reactor 11, and, while supercritical liquid streams containing high-temperature and high-pressure water are injected from opposite sides of the reactor 11, reaction between the intermediate slurry f1 and the supercritical liquid streams occurs in the reactor 11 for a short period of time.

In this regard, the intermediate slurry f1 supplied to the reactor 11 has increased shearing stress over time due to the viscosity of the intermediate slurry f1 and friction on an inner surface of the connection tube 30 and thus does not smoothly move, which results in accumulation of the intermediate slurry f1 on the inner surface thereof. In addition, reaction of the intermediate slurry f1 accumulated at an entrance portion of the reactor 11 occurs, thus causing clogging of the entrance portion thereof.

In addition, when the temperature of the connection tube 30 is increased due to high temperature (about 400° C.) of supercritical water, solubility of an inorganic material included in the intermediate slurry f1 is reduced and thus the inorganic material is deposited onto a surface of the connection tube 30, which results in clogging of the connection tube 30.

Consequently, a continuous operating time of a hydrothermal synthesis device is only about 1 week, and much labor and time are required for disassembly and internal cleaning of the clogged reactor.

Therefore, there is a high need to develop a continuous hydrothermal synthesis device in which a continuous operating time is increased by minimizing clogging of an inlet and thereby productivity may be significantly increased and investment costs may be reduced.

DISCLOSURE

Technical Problem

Therefore, the present invention has been made to solve the above problems and other technical problems that have yet to be resolved.

As a result of a variety of intensive studies and various experiments, the inventors of the present invention developed a hydrothermal synthesis device including a connection tube having hydrophobic coating on an inner surface of a portion thereof adjacent to a reactor, as described below and confirmed that such configuration may enable minimization of clogging of the connection tube and complete prevention of this problem, thus completing the present invention.

Technical Solution

In accordance with one aspect of the present invention, provided is a hydrothermal synthesis device for continuously preparing an inorganic slurry using a hydrothermal method, including:

a mixer to mix at least one precursor solution for preparing an inorganic material, injected via at least one supply tube, to prepare an intermediate slurry;

a connection tube provided at a side of the mixer, continuously discharging the prepared intermediate slurry to a reactor, and having a hydrophobic coating on an inner surface of a portion thereof adjacent to the reactor; and the reactor performing hydrothermal reaction of the intermediate slurry supplied from the connection tube by receiving a liquid stream heated to supercritical or subcritical conditions using a heat exchanger and connected to the connection tube into which the intermediate slurry prepared from the mixer is introduced and to at least one injection tube into which the heated liquid stream is injected.

That is, since the hydrothermal synthesis device according to the present invention includes the connection tube having a hydrophobic coating on an inner surface of a portion thereof adjacent to the reactor, the intermediate slurry containing a hydroxyl group or moisture repels a hydrophobic coating layer and thus the amount of the intermediate slurry accumulated at an entrance portion of the reactor may be significantly reduced, and changes in flow rate of the intermediate slurry may be minimized and thus reaction rate inside the reactor may be kept constant. In addition, an accumulation amount of the intermediate slurry is small and thus early reaction at the entrance portion of the reactor is prevented, and an inorganic material introduced from a supercritical liquid stream and deposited by heat repels a coating layer and easily separates therefrom, which results in significantly reduced clogging.

The supply tube may include a plurality of supply tubes to rapidly supply at least two precursor solutions. In particular, the supply tubes may include a first supply tube disposed at a central portion of an upper surface of the mixer, a second supply tube disposed at a side part of the mixer so as to form an internal angle of 10° to 90° with respect to the first supply tube, and a third supply tube disposed at another side of the mixer so as to face the second supply tube.

In particular, the respective supply tubes may supply inorganic precursor solutions having different components, a supply rate of the precursor solutions may be accelerated by forming an internal angle between the second and third supply tubes, and an intermediate slurry in which at least two precursor solutions are mixed may be smoothly supplied by adjusting a mix rate of the precursor solutions supplied via the second and third supply tubes with the precursor solution supplied via the first supply tube by fluid flow.

In addition, the mixer may be further provided inside thereof with a static or stirring-type stirring member that may enable uniform mixing of precursor solutions and increase in mixing efficiency in consideration of the amount of precursor solutions supplied into the mixer and the size of the hydrothermal synthesis device.

The hydrophobic coating formed on the connection tube may be a coating including a hydrophobic material with high heat resistance and chemical resistance so as to be continuously used over a long period of time under high-temperature conditions using supercritical water.

In a first specific embodiment, the hydrophobic material may be a fluorine group-containing organic material or an organic material substituted with a hydrophobic group. For example, the organic compound may be PTFE, and/or PVA, a hydroxyl group of which is substituted with a hydrophobic group, but is not limited to the above-described examples.

In this regard, the PVA may be a PVA, many of hydroxyl groups as a hydrophilic group of which are substituted with, for example, an alkyl group, an alkyl group substituted with fluorine, an organosilyl group, or the like, thus exhibiting hydrophobicity.

In a second specific embodiment, the hydrophobic material may be a fluorine group-containing inorganic compound. In general, fluorine group-containing inorganic compounds have very high heat resistance and thus do not undergo physical changes even in high-temperature environments, and have low reactivity and thus have high chemical resistance.

For example, the inorganic compounds may be $MgF_2$ and/or $CaF_2$, but are not limited to the above-described examples.

In a third specific embodiment, the hydrophobic coating may be formed of a lubricant coating material. In particular, the lubricant coating material requires lubrication of a contact portion in stringent operating environments and may be tungsten disulfide ($WS_2$) and/or molybdenum disulfide ($MoS_2$) which have oxidation resistance at high temperature, without being limited thereto.

In a fourth specific embodiment, the hydrophobic material may be carbon particles. In general, continuous hydrothermal synthesis devices operate at high temperature and high pressure and thus require strong durability to extend a continuous driving time, and the carbon particles have excellent abrasion resistance when continuously used for a long period of time and thus prevent occurrence of cracks in a surface of a coating layer, which results in enhanced durability of the hydrothermal synthesis device.

In another specific embodiment, the hydrophobic coating may be performed by glass lining so as to minimize the above-described clogging phenomenon by reducing friction on an inner surface of the connection tube, to secure fluidity of the precursor solution, and to enhance corrosion resistance of the hydrothermal synthesis device in a reaction environment using supercritical water.

The hydrophobic coating may be formed using a generally known method. For example, the hydrophobic coating may be formed by preparing a coating solution through mixing of a hydrophobic organic solvent and a hydrophobic material, coating the inner surface of the connection tube with the prepared coating solution, and heat-treating the coated inner surface.

In particular, the hydrophobic coating may be formed by preparing a coating solution through mixing of a hydrophobic organic solvent such as hexadecane, chloroform, carbon tetrachloride, or the like and a hydrophobic material in a mixing ratio (volume ratio) of 300-1200:0.1-50, coating the inner surface of the connection tube with the prepared coating solution, and heat-treating the coated inner surface at a temperature of 100° C. to 600° C. for 30 minutes to 1 hour according to coating components and the thickness of a coating layer.

The thickness of the hydrophobic coating may be, for example, 10 μm to 50 μm. When the thickness of the hydrophobic coating is less than 10 μm, sufficient heat resistance, corrosion resistance and weather resistance are not obtained. On the other hand, when the thickness of the hydrophobic coating exceeds 50 μm, occurrence of cracks in a film surface increases due to film thickening and manufacturing costs are increased.

As described above, the hydrophobic coating is formed on the inner surface of a portion of the connection tube adjacent to the reactor. In another embodiment, the hydrophobic coating may be formed on the entire inner surface of the connection tube. In some embodiments, the hydrophobic coating may be formed on an inner surface of at least one of the mixer, the reactor, and the injection tube, which results in enhanced physical properties, i.e., heat resistance, chemical resistance, corrosion resistance, and the like.

Meanwhile, when the hydrothermal synthesis device operates with supercritical water having a high temperature of 700° C. or greater, a cooling member may further be installed at an outer portion of the connection tube, to prevent deposition of an inorganic material onto the surface of the connection tube due to heat transferred from a heated liquid stream. The cooling member may further suppress clogging of an entrance of the reactor occurring by cooling of the precursor solution at the entrance of the reactor to reaction temperature or less. The cooling member may, for example, be a double pipe/tube type cooling jacket, a thermally conductive metal pipe equipped with a heat exchanger, or the like, but embodiments of the present invention are limited thereto.

The above-described conditions are conditions for optimizing hydrothermal synthesis in the hydrothermal synthesis device of the present invention and may vary according to various manufacturing conditions such as a precursor, an inorganic material, a production rate, and the like.

The supercritical liquid stream may, for example, be supercritical water heated under conditions of a temperature of 350° C. to 800° C. and a pressure of 180 bar to 550 bar.

When supercritical water is used, temperature and pressure may be arbitrarily set. However, the temperature and pressure may be set to 700° or less and 550 bar or less in consideration of equipment problems, reaction control problems, and the like.

The supercritical liquid stream injected into the reactor may include at least one supercritical liquid stream. In particular, at least two supercritical liquid streams may be injected into the reactor in respective injection directions and injection directions thereof may be freely set in consideration of desired reaction atmosphere and driving time.

Thus, inlet position angles and the like of injection tubes through which the supercritical liquid streams are injected into the reactor may each independently be freely selected and, in particular, the injection tubes may be two injection tubes disposed at outer surfaces of the reactor. More particularly, the injection tubes may be positioned so as to form an angle of 10° to 170°, in particular 45° to 135°, with respect to a discharge direction of an inorganic slurry prepared according to desired reaction atmosphere.

In addition, the present invention provides a method of preparing an inorganic slurry by using the hydrothermal synthesis device, including:

injecting, into a mixer, a first precursor solution for preparation of an inorganic material via a first supply tube and a second precursor solution for preparation of an inorganic material via each of second and third supply tubes;

injecting, into a reactor, an intermediate slurry prepared through mixing of the injected first and second precursor solutions via a connection tube;

injecting supercritical water containing high-temperature and high-pressure water into the reactor via an injection tube; and preparing an inorganic slurry by hydrothermal reaction in the reactor and continuously discharging the prepared inorganic slurry therefrom.

Such hydrothermal synthesis may be applied to preparation of inorganic materials using a conventional hydrothermal synthesis method and also be applied to preparation of inorganic materials that is difficult to efficiently implement using a conventional hydrothermal synthesis method, due to the advantages described above.

The present invention also provides a cathode active material prepared using the above-described method.

The inorganic material is not particularly limited so long as the inorganic material may be prepared using a hydrothermal method. For example, the inorganic material may be at least one selected from the group consisting of $Co_2O_3$, $Fe_2O_3$, $LiMn_2O_4$, $MO_x$ where M is Fe, Ni, Co, Mn, Al, or the like and x is a number providing electroneutrality, MOOH where M is Fe, Ni, Co, Mn, Al, or the like, and $A_aM_mX_xO_oS_sN_nF_f$ where A is at least one selected from the group consisting of Li, Na, K, Rb, Cs, Be, Mg, Ca, Sr, and Ba; M may contain at least one transition metal and optionally contain at least one selected from the group consisting of B, Al, Ga, and In; X is at least one selected from the group consisting of P, As, Si, Ge, Se, Te, and C; O is oxygen; S is sulfur; N is nitrogen; F is fluorine; and a, m, x, o, s, n, and f are each independently a number of 0 or more, providing electroneutrality.

In a specific embodiment, the inorganic material may be $Li_aM_bM'_cPO_4$ where M is at least one selected from the group consisting of Fe, Ni, Co, and Mn; M' is at least one selected from the group consisting of Ca, Ti, S, C, and Mg; and a, b, and c are each independently a number of 0 or more, providing electroneutrality, in particular an olivine-structure $LiFePO_4$.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a schematic view of a conventional hydrothermal synthesis device;

FIG. 2 is a view of a hydrothermal synthesis device according to an embodiment of the present invention;

FIG. 3 is an enlarged view of portion A of FIG. 2;

FIG. 4 is a view of a connection tube, according to another embodiment of the present invention;

FIG. 5 is a view of a hydrothermal synthesis device including a connection tube provided with a cooling member according to another embodiment of the present invention; and FIG. 6 is a schematic view of a hydrothermal synthesis device including a mixer, a reactor, an injection tube, and a connection tube, inner surfaces of which are coated with a hydrophobic material, according to another embodiment of the present invention.

BEST MODE

Now, the present invention will be described in more detail with reference to the following examples. These examples are provided only for illustration of the present invention and should not be construed as limiting the scope and spirit of the present invention.

FIG. 2 is a view of a hydrothermal synthesis device 100 according to an embodiment of the present invention. FIG. 3 is an enlarged view of portion A of FIG. 2.

Referring to FIG. 2, a Li precursor solution is injected via a first supply tube 122 installed at an upper portion of a mixer 120, and a precursor solution containing Fe and P is supplied via each of second and third supply tubes 123 and 124 positioned at side portions of the mixer 120 so as to form an internal angle θ of 10° to 90° with respect to the first supply tube 122. The supplied precursor solutions are naturally mixed inside the mixer 120 by fluid flow to prepare an intermediate slurry F1. Thus, such structure is suitable for supply and mixing of different precursor solutions, and the second and third supply tubes 123 and 124 form inclined surfaces with respect to the first supply tube 122 and thus mixing amounts of precursor solutions according to movement rates may be adjusted.

The intermediate slurry F1 prepared in the mixer 120 is introduced into a reactor 101 along a connection tube 130 positioned so as to connect a lower end of the mixer 120 to a top end of the reactor 101, and the introduced intermediate slurry F1 reacts at high temperature with supercritical liquid streams injected via two injection tubes 102 installed at an outer surface of the reactor 101 to prepare an inorganic slurry and the inorganic slurry is continuously discharged from the reactor 101.

Referring to FIG. 3, a coating layer 140 formed of a hydrophobic material is formed on an inner surface of a portion of the connection tube 130 adjacent to the reactor 101. Thus, resistance occurring due to friction between the intermediate slurry, which is water-soluble, and the inner surface is minimized due to repellency of the coating layer 140 to the intermediate slurry and, accordingly, clogging of the connection tube 130 starting from an edge of the inner surface of a portion of the connection tube 130 adjacent to the reactor 101 is significantly reduced.

FIG. 4 is a view of a connection tube 230, according to another embodiment of the present invention.

Referring to FIG. 4, a coating layer 240 formed of a hydrophobic material is coated on the entire inner surface of the connection tube 230. In general, complete coating of an inner surface of a connection tube is disadvantageous in that it is difficult to form a coating layer to uniform thickness. However, there is little loss of movement of the intermediate slurry in a proceeding direction in a process of introducing the intermediate slurry into a reactor from a mixer and thus the amount of an inorganic material in the reaction product is greater than that in a conventional device.

FIG. 5 is a view of a hydrothermal synthesis device 300 including a connection tube 330 provided with a cooling member 332 according to another embodiment of the present invention.

Referring to FIG. 5, the cooling member 332 made of a metal tube or a heat sink contacting a refrigerant having a temperature of about 10° C. is positioned at an outer portion of the connection tube 330. The cooling member 332 suppresses deposition and early reaction by rapidly dissipating heat transferred from a supercritical liquid stream and, accordingly, hydrophobic coating effects may be maximized.

FIG. 6 is a schematic view of a hydrothermal synthesis device 400 including a mixer 420, a reactor 401, an injection tube 402, and a connection tube 430, inner surfaces of which are coated with a hydrophobic material, according to another embodiment of the present invention.

Referring to FIG. 6, the hydrothermal synthesis device 400 has the same basic structure as that of the hydrothermal synthesis device 100 of FIG. 2, except that the hydrothermal synthesis device 400 has a structure in which a coating layer formed of a hydrophobic material is formed on an inner surface of each of the mixer 420, the reactor 401, the injection tube 402, and the connection tube 430 to enhance durability of the hydrothermal synthesis device 400 operating under high temperature and high pressure conditions.

The hydrothermal synthesis device 400 prevents corrosion of an inner surface thereof from heat of a supercritical liquid stream introduced into the reactor 401 in preparation of an inorganic slurry for a cathode active material and a cathode active material including the inorganic slurry prepared using the hydrothermal synthesis device 400 has uniform particle size distribution due to improvement on fluidity of the intermediate slurry F1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a hydrothermal synthesis device according to the present invention includes a connection tube having a hydrophobic coating formed on an inner surface of a portion thereof adjacent to a reactor and thus clogging of the connection tube may be minimized or completely prevented, which results in significantly increased manufacturing efficiency.

The invention claimed is:

1. A hydrothermal synthesis device for continuously preparing an inorganic slurry using a hydrothermal method, the hydrothermal synthesis device comprising:
   a mixer to mix at least one precursor solution for preparing an inorganic material, injected via at least one supply tube, to prepare an intermediate slurry;
   a connection tube provided at a side of the mixer, continuously discharging the prepared intermediate slurry to a reactor, and having a hydrophobic coating on an inner surface of a portion thereof adjacent to the reactor; and the reactor performing hydrothermal reaction of the intermediate slurry supplied from the connection tube by receiving a liquid stream heated to supercritical or subcritical conditions using a heat exchanger and connected to the connection tube into which the intermediate slurry prepared from the mixer is introduced and to at least one injection tube into which the heated liquid stream is injected, wherein the hydrophobic coating is a coating comprising a hydrophobic material, and wherein the hydrophobic material is an inorganic compound having a fluorine group or the hydrophobic material includes carbon particles.

2. The hydrothermal synthesis device according to claim 1, wherein the at least one supply tube comprises a first supply tube disposed at a central portion of an upper surface of the mixer, a second supply tube disposed at a side part of the mixer so as to form an internal angle of 10° to 90° with respect to the first supply tube, and a third supply tube disposed at another side of the mixer so as to face the second supply tube.

3. The hydrothermal synthesis device according to claim 1, wherein the hydrophobic coating is formed by coating an inner surface of the connection tube with a coating solution prepared through mixing of a hydrophobic organic solvent and the hydrophobic material and heat-treating the coated inner surface of the connection tube.

4. The hydrothermal synthesis device according to claim 3, wherein a mixing ratio (volume ratio) of the hydrophobic organic solvent to the hydrophobic material is 300-1200: 0.1-50, and the heat-treating is performed at 100° C. to 600° C. for 30 minutes to 1 hour.

5. The hydrothermal synthesis device according to claim 1, wherein the hydrophobic coating has a thickness of 10 μm to 50 μm.

6. The hydrothermal synthesis device according to claim 1, wherein the hydrophobic coating is formed on an entire inner surface of the connection tube.

7. The hydrothermal synthesis device according to claim 1, wherein the hydrophobic coating is formed on an inner surface of at least one of the mixer, the reactor, and the at least one injection tube.

8. The hydrothermal synthesis device according to claim 1, wherein the connection tube is provided at an outer portion thereof with a cooling member to dissipate heat transferred from the heated liquid stream.

9. The hydrothermal synthesis device according to claim 1, wherein the liquid stream is supercritical water heated at a temperature of 350° C. to 800° C. and a pressure of 180 bar to 550 bar.

10. The hydrothermal synthesis device according to claim 1, wherein the at least one injection tube comprises two injection tubes disposed at outer sides of the reactor.

11. A method of preparing an inorganic slurry by using the hydrothermal synthesis device according to claim 1, the method comprising:

injecting, into a mixer, a first precursor solution for preparation of an inorganic material via a first supply tube and a second precursor solution for preparation of the inorganic material via each of second and third supply tubes;

introducing, into a reactor, an intermediate slurry prepared through mixing of the injected first and second precursor solutions via a connection tube;

injecting supercritical water containing high-temperature and high-pressure water into the reactor via an injection tube; and preparing an inorganic slurry by hydrothermal reaction in the reactor and continuously discharging the prepared inorganic slurry.

12. The hydrothermal synthesis device according to claim 1, wherein the inorganic compound is $MgF_2$ and/or $CaF_2$.

13. A hydrothermal synthesis device for continuously preparing an inorganic slurry using a hydrothermal method, the hydrothermal synthesis device comprising:

a mixer to mix at least one precursor solution for preparing an inorganic material, injected via at least one supply tube, to prepare an intermediate slurry;

a connection tube provided at a side of the mixer, continuously discharging the prepared intermediate slurry to a reactor, and having a hydrophobic coating on an inner surface of a portion thereof adjacent to the reactor; and the reactor performing hydrothermal reaction of the intermediate slurry supplied from the connection tube by receiving a liquid stream heated to supercritical or subcritical conditions using a heat exchanger and connected to the connection tube into which the intermediate slurry prepared from the mixer is introduced and to at least one injection tube into which the heated liquid stream is injected, wherein the hydrophobic coating is formed of a lubricant coating material, and wherein the lubricant coating material is tungsten disulfide ($WS_2$) and/or molybdenum disulfide ($MoS_2$).

14. The hydrothermal synthesis device according to claim 13, wherein the at least one supply tube comprises a first supply tube disposed at a central portion of an upper surface of the mixer, a second supply tube disposed at a side part of the mixer so as to form an internal angle of 10° to 90° with respect to the first supply tube, and a third supply tube disposed at another side of the mixer so as to face the second supply tube.

15. The hydrothermal synthesis device according to claim 13, wherein the hydrophobic coating has a thickness of 10 μm to 50 μm.

16. The hydrothermal synthesis device according to claim 13, wherein the hydrophobic coating is formed on an entire inner surface of the connection tube.

17. The hydrothermal synthesis device according to claim 13, wherein the hydrophobic coating is formed on an inner surface of at least one of the mixer, the reactor, and the at least one injection tube.

18. The hydrothermal synthesis device according to claim 13, wherein the connection tube is provided at an outer portion thereof with a cooling member to dissipate heat transferred from the heated liquid stream.

19. The hydrothermal synthesis device according to claim 13, wherein the liquid stream is supercritical water heated at a temperature of 350° C. to 800° C. and a pressure of 180 bar to 550 bar.

20. The hydrothermal synthesis device according to claim 13, wherein the at least one injection tube comprises two injection tubes disposed at outer sides of the reactor.

21. A method of preparing an inorganic slurry by using the hydrothermal synthesis device according to claim 13, the method comprising:

injecting, into a mixer, a first precursor solution for preparation of an inorganic material via a first supply tube and a second precursor solution for preparation of the inorganic material via each of second and third supply tubes;

introducing, into a reactor, an intermediate slurry prepared through mixing of the injected first and second precursor solutions via a connection tube;

injecting supercritical water containing high-temperature and high-pressure water into the reactor via an injection tube; and preparing an inorganic slurry by hydrothermal reaction in the reactor and continuously discharging the prepared inorganic slurry.

* * * * *